(12) United States Patent
Sugimoto

(10) Patent No.: US 11,442,047 B2
(45) Date of Patent: Sep. 13, 2022

(54) CHROMATOGRAPH MASS SPECTROMETRY DATA PROCESSING DEVICE AND CHROMATOGRAPH MASS SPECTROMETRY DATA PROCESSING PROGRAM

(71) Applicant: SHIMADZU CORPORATION, Kyoto (JP)

(72) Inventor: Shinji Sugimoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 531 days.

(21) Appl. No.: 16/603,633

(22) PCT Filed: May 8, 2017

(86) PCT No.: PCT/JP2017/017358
§ 371 (c)(1),
(2) Date: Oct. 8, 2019

(87) PCT Pub. No.: WO2018/207228
PCT Pub. Date: Nov. 15, 2018

(65) Prior Publication Data
US 2020/0110064 A1 Apr. 9, 2020

(51) Int. Cl.
*G01N 30/72* (2006.01)
*G01N 30/86* (2006.01)

(52) U.S. Cl.
CPC ..... *G01N 30/7206* (2013.01); *G01N 30/7233* (2013.01); *G01N 30/8651* (2013.01);
(Continued)

(58) Field of Classification Search
CPC ........... G01N 30/7206; G01N 30/7233; G01N 30/8651; G01N 30/8665; G01N 30/8675;
(Continued)

(56) References Cited

U.S. PATENT DOCUMENTS

2010/0280764 A1  11/2010  Thomson et al.
2017/0108478 A1   4/2017  Tainaka

FOREIGN PATENT DOCUMENTS

JP     2011-512534 A    4/2011
JP     2011-242255 A   12/2011
(Continued)

OTHER PUBLICATIONS

GC/MS&LC/MS-yo Takentai Teiryo Shien Software LabSolutions Insight, Shimadzu Corp, [online J,Oct. 2, 2015 (Oct. 2, 2015), Internet <URL:http://www.an.shimadzu.co.jp/data-net/labsolutions/insight/index.htm>, 15 pages.
(Continued)

*Primary Examiner* — Jennifer Wecker
*Assistant Examiner* — Michael Paul Shimek
(74) *Attorney, Agent, or Firm* — Sughrue Mion, PLLC

(57) ABSTRACT

A confirmation ion ratio allowable value calculation unit calculates a confirmation ion ratio allowable value when a target ion and confirmation ions are interchanged based on a preset confirmation ion ratio allowable value, and a peak identification processing unit identifies mass peaks of the target ion and the confirmation ions based on the confirmation ion ratio allowable value. A peak waveform processing unit calculates peak areas of the target ion and the confirmation ions, and a calibration curve creation unit creates calibration curves for quantification based on the target ion and the confirmation ions from a peak area of a target compound included in a standard sample. A quantitative value calculation unit obtains quantitative values while referring to a calibration curve corresponding to a peak area for a target compound included in an unknown sample. A quantitative analysis result display processing unit displays the quantitative values and chromatogram peak waveforms.

4 Claims, 4 Drawing Sheets

(52) U.S. Cl.
CPC ..... *G01N 30/8665* (2013.01); *G01N 30/8675* (2013.01); *G01N 30/8682* (2013.01); *G01N 30/8689* (2013.01); *G01N 30/8696* (2013.01)

(58) Field of Classification Search
CPC ........... G01N 30/8682; G01N 30/8689; G01N 30/8696; G01N 30/8679; G01N 27/62
See application file for complete search history.

(56) References Cited

FOREIGN PATENT DOCUMENTS

| | | | |
|---|---|---|---|
| JP | 2014-134385 | A | 7/2014 |
| JP | 2016-133444 | A | 7/2016 |
| WO | 2009/103050 | A1 | 8/2009 |
| WO | 2015/189949 | A1 | 12/2015 |

OTHER PUBLICATIONS

International Search Report for PCT/JP2017/017358 dated Aug. 1, 2017 (PCT/ISA/210).
Written Opinion for PCT/JP2017/017358 dated Aug. 1, 2017 (PCT/ISA/237).

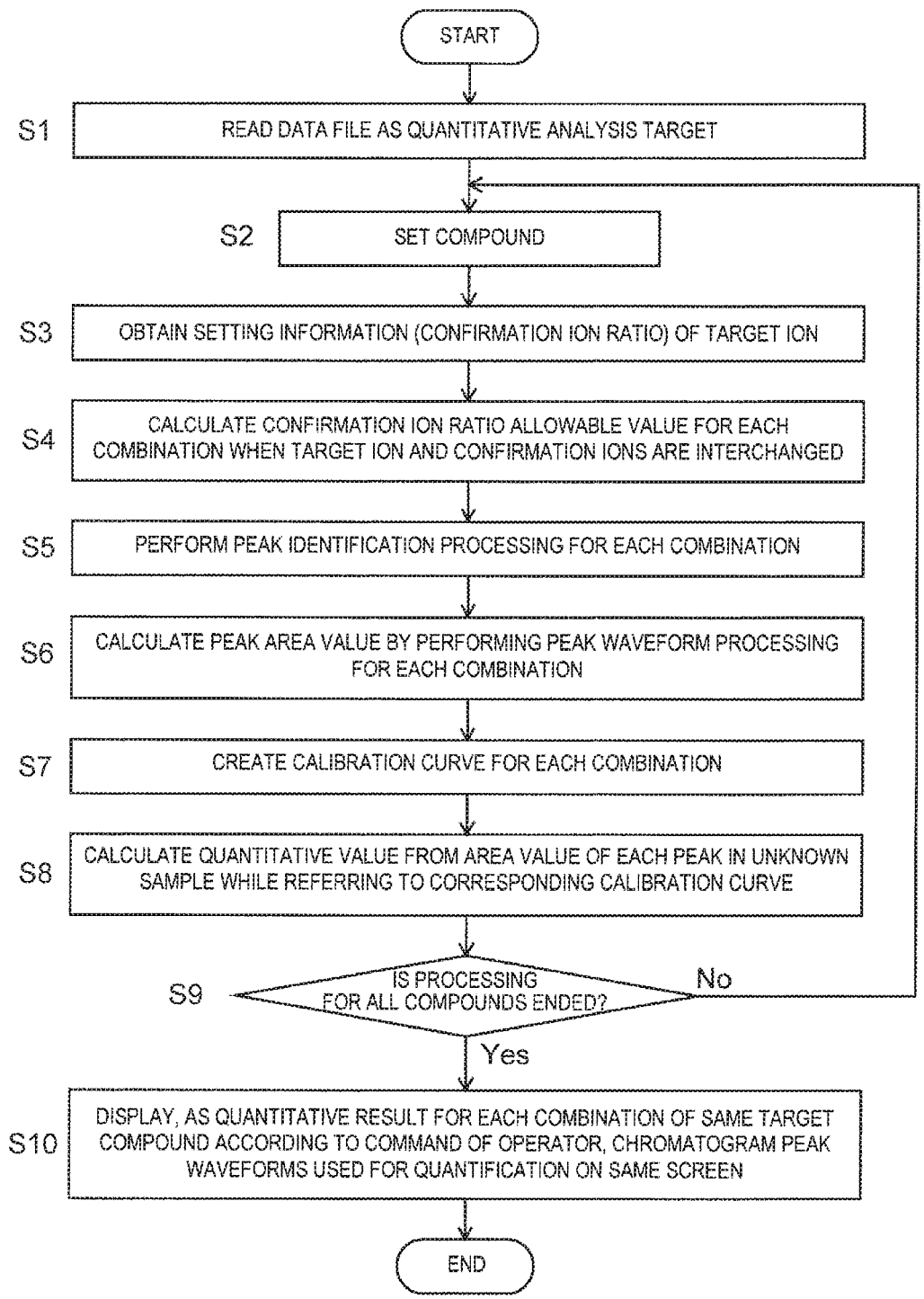

Fig. 3A
MS/MS SPECTRUM
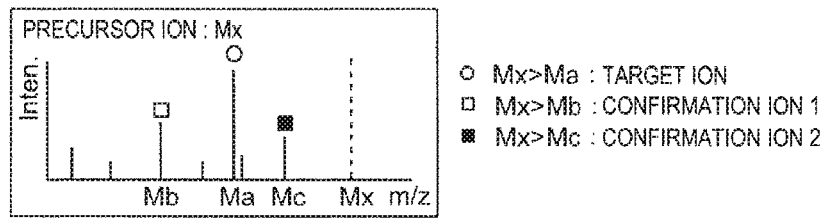
Fig. 3B
CHROMATOGRAM
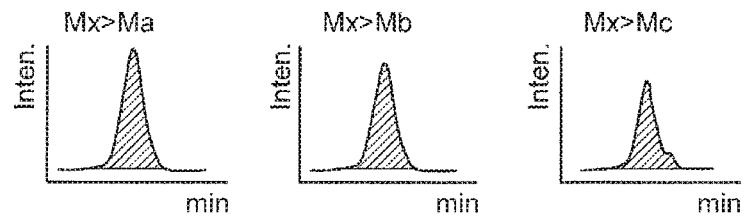
Fig. 3C
INTERCHANGE OF TARGET ION AND CONFIRMATION IONS
| m/z | ORIGINAL COMBINATION | INTERCHANGE 1 | INTERCHANGE 2 |
|---|---|---|---|
| Mx>Ma | TARGET | CONFIRMATION | CONFIRMATION |
| Mx>Mb | CONFIRMATION | TARGET | CONFIRMATION |
| Mx>Mc | CONFIRMATION | CONFIRMATION | TARGET |
| | [A] | [B] | [C] |
Fig. 3D
CREATION OF CALIBRATION CURVE AND QUANTIFICATION
PERFORM FOR EACH COMBINATION OF [A], [B], AND [C]
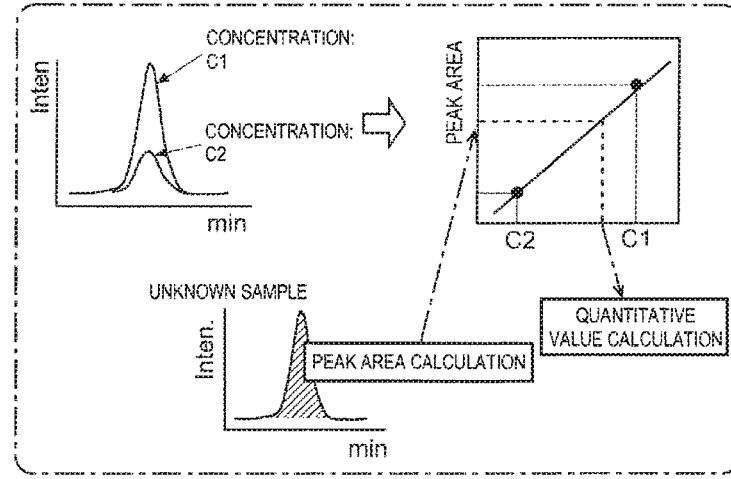

CHROMATOGRAPH MASS SPECTROMETRY DATA PROCESSING DEVICE AND CHROMATOGRAPH MASS SPECTROMETRY DATA PROCESSING PROGRAM

CROSS REFERENCE TO RELATED APPLICATIONS

This application is a National Stage of International Application No. PCT/JP2017/017358 filed May 8, 2017.

TECHNICAL FIELD

The present invention relates to a chromatograph mass spectrometry data processing device that processes data collected by a chromatograph mass spectrometer such as a liquid chromatograph mass spectrometer (LC-MS) or a gas chromatograph mass spectrometer (GC-MS), and a computer program making a computer execute the data processing.

BACKGROUND ART

In a chromatograph mass spectrometer such as GC-MS or LC-MS, various compounds contained in a sample are temporally separated through a column in a gas chromatograph or a liquid chromatograph. Ions generated from each separated compound are separated according to mass-to-charge ratio in a rear-stage mass spectrometer, and are detected by a detector. As the mass spectrometer, a quadrupole mass spectrometer using a quadrupole mass filter as a mass separator is widely used. In recent years, a tandem mass spectrometer such as a triple quadrupole mass spectrometer having a high impurity-eliminating effect is often used.

When a known compound contained in a sample is quantified using such a chromatograph mass spectrometer, an ion characterizing the compound is generally defined as a target ion, and selected ion monitoring (SIM) measurement or multiple reaction monitoring (MRM) measurement for the target ion is performed by the mass spectrometer. An extraction ion chromatogram (also referred to as a mass chromatogram) for the target ion is created based on data obtained through actual measurement, and a content or a concentration of a target compound is calculated from an area (or a peak height) value of a peak appearing near the retention time of the target compound in the chromatogram. An ion corresponding to a peak indicating the maximum signal intensity in a typical mass spectrum of the compound is generally selected as the target ion.

Since the target ion is used exclusively for quantification, it is sometimes referred to as a quantitative ion. However, in the present specification, since a confirmation ion to be described below other than the target ion may be used for quantification, an ion set for quantification is initially referred to as the target ion.

Although a target ion of a compound is an ion that characterizes the compound, an actual sample includes various impurities. When a separation condition in the chromatography is not appropriate, components may be insufficiently separated, and two or more compounds may overlap. In such a case, even though only a peak on the extraction ion chromatogram of the target ion having a specific mass-to-charge ratio is observed, it is difficult to confirm whether the peak is indeed derived from the target compound alone or the target compound overlaps with another compound. Thus, in the quantitative analysis using the chromatograph mass spectrometer, an ion having a mass-to-charge ratio that characterizes the compound is generally selected as a confirmation ion (also referred to as a reference ion) other than the target ion. The ratio (hereinafter, referred to as a "confirmation ion ratio") of signal intensity of a peak of the confirmation ion on a mass spectrum (hereinafter, a peak on a mass spectrum is referred to as a "mass peak" in order to distinguish it from a peak on a chromatogram) of actual measurement and a mass peak of the target ion is calculated, and it is confirmed that the target ion is truly derived from the target compound by using the confirmation ion ratio, that is, peak identification of the target ion is performed (See Patent Literatures 1 and 2). When there is a possibility that two or more compounds having similar structures are contained, it is inappropriate to use only one kind of confirmation ion for accurately identifying the target ion of the certain compound, and multiple kinds (in general, two kinds) of confirmation ions may be used for one compound.

The quantitative analysis using the target ion and the confirmation ions described above is often used in a "multi-component simultaneous analysis" in which a plurality of compounds contained in a sample are simultaneously analyzed. The multi-component simultaneous analysis is done in, for example, an analysis of residual pesticides in food and environmental water. In such analysis, it is necessary to set the target ion and the confirmation ions in advance for each compound. Since quantitative analysis results sometimes differ much depending on the setting of the target ion and the confirmation ions, it is important to appropriately select the target ion and the confirmation ions for accurate quantification.

As described above, a quantitative value is generally obtained based on the area value of the peak on the extraction ion chromatogram of the target ion at which the largest signal intensity is maximum. However, when impurities overlap on the peak, the quantification is disrupted. Since the target ion and the confirmation ions are ions derived from one compound, these ions demonstrate similar behavior. Thus, when the quantification based on the target ion is not appropriate as described above, a method of interchanging the target ion and the confirmation ions and performing the quantification based on the area values of the chromatogram peaks of the confirmation ions has been known.

In the general quantitative analysis, operation processing such as peak identification and peak area calculation is performed based on the predetermined target ion and confirmation ions. Thus, when the target ion is changed to the confirmation ion, or vice versa, it is necessary to perform the quantitative analysis again including changing the condition setting, which requires time and efforts. Especially in the multi-component simultaneous analysis, the quantification may be performed for a large number of compounds ranging from tens to hundreds of compounds in one measurement. However, when the quantitative analysis is performed again for such a large number of compounds while changing the condition setting of the compounds one by one, it takes a lot of time.

In addition, even if the target ion and the confirmation ion are exchanged to obtain a new quantitative analysis result, it is necessary for the user (person in charge of analysis) to determine which of the quantitative analysis results is appropriate. However, it is not easy to compare quantitative analysis results. Furthermore, when it is concluded that the quantitative analysis result before the interchange is appropriate, the time spent to perform the interchange operation and perform the quantitative analysis again is wasted, and the efficiency of the quantitative analysis operation is greatly reduced.

CITATION LIST

Patent Literature

Patent Literature 1: JP 2016-133444 A
Patent Literature 2: WO 2015/189949 A

SUMMARY OF INVENTION

Technical Problem

The present invention has been made in order to solve the above-mentioned problems, and an object of the present invention is to provide a chromatograph mass spectrometry data processing device and a chromatograph mass spectrometry data processing program capable of reducing time and effort to perform an interchanging operation of a target ion and a confirmation ion, and capable of allowing a user to accurately and easily perform the comparison of quantitative analysis results or determination of which of the quantitative analysis results is the most appropriate in a case where the target ion and the confirmation ion are not interchanged, in a case where the target ion and the confirmation ions are interchanged, and in a case where one of a plurality of confirmation ions is used for quantification.

Solution to Problem

A chromatograph mass spectrometry data processing device according to the present invention which has been made in order to solve the aforementioned problems is a chromatograph mass spectrometry data processing device that creates extraction ion chromatograms for a target ion having a predetermined mass-to-charge ratio and one or a plurality of confirmation ions having a mass-to-charge ratio different from the mass-to-charge ratio of the target ion which are derived from a target compound based on data collected by measuring a sample including the target compound by using a chromatograph mass spectrometer and quantifies the target compound by using peaks on the extraction ion chromatograms. The device includes:

a) a target-ion-based quantitative calculation unit configured to create the extraction ion chromatogram of the target ion determined for the target compound in advance based on the data collected through the measurement, and calculates a quantitative value by using an area or a height of the peak corresponding to the target compound on the chromatogram, b) a confirmation-ion-based quantitative calculation unit configured to create the extraction ion chromatograms of the one or the plurality of confirmation ions determined for the target compound in advance based on the data, and calculates quantitative values by using areas or heights of the peaks corresponding to the target compound on the chromatograms, and c) a display processing unit configured to form, as a quantitative analysis result of the target compound, a display image on which the quantitative value of the target compound obtained by the target-ion-based quantitative calculation unit and a peak waveform of the extraction ion chromatogram used for the calculation and the quantitative values of the target compound obtained by the confirmation-ion-based quantitative calculation unit and peak waveforms of the extraction ion chromatograms used for the calculation are arranged on the same screen, and displays the formed display image on a screen of a display unit.

A chromatograph mass spectrometry data processing program according to the present invention which has been made in order to solve the aforementioned problems is a chromatograph mass spectrometry data processing program making a computer create extraction ion chromatograms for a target ion having a predetermined mass-to-charge ratio and one or a plurality of confirmation ions having a mass-to-charge ratio different from the mass-to-charge ratio of the target ion which are derived from a target compound based on data collected by measuring a sample including the target compound by using a chromatograph mass spectrometer and quantifies the target compound by using peaks on the extraction ion chromatograms. The program makes the computer execute:

a) a target-ion-based quantitative calculation step of creating the extraction ion chromatogram of the target ion determined for the target compound in advance based on the data collected through the measurement, and calculating a quantitative value by using an area or a height of the peak corresponding to the target compound on the chromatogram.

b) a confirmation-ion-based quantitative calculation step of creating the extraction ion chromatograms of the one or the plurality of confirmation ions determined for the target compound in advance based on the data, and calculating quantitative values by using areas or heights of the peaks corresponding to the target compound on the chromatograms, and c) a display processing step of forming, as a quantitative analysis result of the target compound, a display image on which the quantitative value of the target compound obtained in the target-ion-based quantitative calculation step and a peak waveform of the extraction ion chromatogram used for the calculation and the quantitative values of the target compound obtained in the confirmation-ion-based quantitative calculation step and peak waveforms of the extraction ion chromatograms used for the calculation are arranged on the same screen, and displaying the formed display image on a screen of a display unit.

In the chromatograph mass spectrometry data processing device and the chromatograph mass spectrometry data processing program according to the present invention, the "chromatograph mass spectrometer" is a gas chromatograph mass spectrometer or a liquid chromatograph mass spectrometer.

Further, the mass spectrometer in the "chromatograph mass spectrometer" may be either a mass spectrometer capable of performing only simple mass spectrometry or a mass spectrometer capable of performing MS/MS analysis. In the former case, the mass spectrometer is typically a quadrupole mass spectrometer. In this case, the target ion or confirmation ion is an ion to be selected in selected ion monitoring (SIM) measurement, that is, a mass-to-charge ratio value. In the latter case, the mass spectrometer is typically a triple quadrupole mass spectrometer or a quadrupole time-of-flight mass spectrometer (q-TOF MS). In this case, the target ion and confirmed ion are MRM transitions to be selected in MRM measurement, that is, a set of mass-to-charge ratio values of precursor ion and product ion.

In the chromatograph mass spectrometry data processing device according to the present invention which is realized by making the computer execute the chromatograph mass spectrometry data processing program, for example, when one or a plurality of data files that stores data which is a quantitative analysis target is designated by a user, the target-ion-based quantitative calculation unit creates the extraction ion chromatogram of the target ion determined for the target compound in advance based on the data stored in the data file. For example, the area value of the peak corresponding to the target compound on the extraction ion chromatogram, that is, to be observed at or near the retention time of the target compound is calculated, and the quantitative value is calculated by comparing the area value with the calibration curve for the target ion. This is a calculation method of the quantitative value generally used in the chromatograph mass spectrometry data processing device.

The confirmation-ion-based quantitative calculation unit creates the extraction ion chromatograms of one or a plurality of confirmation ions determined for the target compound in advance based on the data stored in the data file, similar to the target ion. For example, the area value of the peak corresponding to the target compound is calculated on the extraction ion chromatogram for each confirmation ion, and the quantitative value is calculated by comparing the area value with the calibration curve for each confirmation ion. That is, the quantitative values are calculated by using the confirmation ions which are not generally used for quantification.

The calibration curve for the target ion and the calibration curves for the confirmation ions can be prepared by the absolute calibration curve method (external standard method) or an internal standard method. When the calibration curve is created by the absolute calibration curve method, for example, a plurality of standard samples containing various concentrations of the target compound may be measured prior to, or immediately after, the measurement of the unknown sample which is the quantitative analysis target. Then the calibration curve indicating the relationship between the concentration and the peak area or height can be created from the area or height of the peak on the extraction ion chromatogram created based on the data obtained in this measurement. When the extraction ion chromatogram of the target ion is used, the calibration curve for the target ion is created, and when the extraction ion chromatograms of the confirmation ions are used, the calibration curves for the confirmation ions are created.

When the quantitative analysis result using the target ion and the quantitative analysis result using the confirmation ions for the target compound are obtained, the display processing unit forms a display image on which the plurality of quantitative analysis results and the peak waveforms of the plurality of extraction ion chromatograms used for calculation of the quantitative values are arranged on the same screen. Here, the peak waveforms of the plurality of extraction ion chromatograms may be arranged vertically or horizontally on the display screen, or may be displayed so as to overlap with each other within the same graph frame. Alternatively, the plurality of peak waveforms may be displayed so as to overlap with a slight shift from one another within the same graph frame. In any way, the peak waveforms used for calculating different quantitative values may be displayed so as to be visually comparable with ease. The display image formed in this manner is displayed on the screen of the display unit, and is presented to the user.

Accordingly, the quantitative analysis result using the target ion of the target compound and the quantitative analysis result using the confirmation ions which are not originally used for quantification are displayed at once on the same screen of the display unit. In this case, the peak waveforms of the extraction ion chromatograms used for the quantitative calculation are displayed together. When a peak of the target compound is overlapped with a peak of an impurity, or when an abnormal fluctuation occurs in a baseline, the user can normally recognize such overlap or fluctuation in the peak waveform. Therefore, the user can easily and accurately determine which of the target ion and the confirmation ion or which of the plurality of confirmation ions is appropriate for quantification by comparing the plurality of displayed peak waveforms.

In the chromatograph mass spectrometry data processing device according to the present invention, preferably, the target-ion-based quantitative calculation unit and the confirmation-ion-based quantitative calculation unit may be configured to calculate the quantitative values while referring to a calibration curve for the target ion and calibration curves for the confirmation ions which are created based on data obtained by measuring a standard sample including a target compound having a known concentration, and the display processing unit may form a display image on which the quantitative value of the target compound obtained by using the target ion and the peak waveform of the extraction ion chromatogram used for the calculation, the quantitative values of the target compound obtained by using the confirmation ions and the peak waveforms of the extraction ion chromatograms used for the calculation, and all the calibration curves for the target ion and the confirmation ions referred to during the quantitative calculation or the calibration curve selected from the plurality of calibration curves are arranged on the same screen.

At the time of obtaining the quantitative values while referring to the calibration curves, when the linearity of the calibration curve itself is not favorable, or when the variation of the plot at the time of creating the calibration curve is large, it is considered that the reliability of the calculated quantitative value is low. Thus, the shape of the calibration curve or the relationship between the calibration curve and the actual measurement plot is one important index in determining which of the target ion and the confirmation ions or which of the plurality of confirmation ions is appropriate for quantification. According to the above preferred configuration, since the calibration curve used to calculate the quantitative value is displayed on the same screen as the quantitative analysis result, the user can determine the accuracy of the quantification based on the calibration curve.

When it is desired to quantify a plurality of target compounds contained in one sample as in the multi-component simultaneous analysis, the calculation using the target-ion-based quantitative calculation unit and the confirmation-ion-based quantitative calculation unit may be performed for each target compound, and the display processing unit may display the quantitative analysis result of one target compound selected by the user among the plurality of target compounds. In this case, the list on which one of the plurality of target compounds can be selected by a click operation is displayed on the same screen as the above quantitative analysis results, and thus, the user can view the quantitative analysis results by easily selecting the target compound to be confirmed.

Advantageous Effects of Invention

In accordance with the chromatograph mass spectrometry data processing device and the chromatograph mass spectrometry data processing program according to the present invention, the user can confirm the quantitative analysis results obtained by interchanging the target ion and the confirmation ions set in advance, that is, the quantitative analysis results using the confirmation ions together with the quantitative analysis result using the target ion on the display screen. Therefore, the user can easily and accurately determine which of the target ion and the confirmation ions is appropriate for quantification or which of the plurality of confirmation ions is appropriate for quantification.

Further, in the chromatograph mass spectrometry data processing device and the chromatograph mass spectrometry data processing program according to the present invention, after the quantitative analysis using the target ion is performed and the result thereof is displayed, the quantitative analysis using the target ion and the quantitative analysis using the confirmation ions are performed from the beginning according to any operation instead of performing the quantitative analysis in which the target ion and the confirmation ions are interchanged, and the plurality of quantitative analysis results are displayed together. Accordingly, the user can examine the quantitative analysis result using the target ion and one or the plurality of quantitative analysis results using the confirmation ions at one time. Therefore, it is possible to efficiently perform the quantitative analysis without requiring unnecessary time for examination and determination by the user.

BRIEF DESCRIPTION OF DRAWINGS

FIG. 2 is a flowchart showing a procedure of characteristic quantitative analysis processing in the GC-MS system of the present embodiment.

FIGS. 3A to 3D are explanatory diagrams of the characteristic quantitative analysis processing shown in FIG. 2.

DESCRIPTION OF EMBODIMENTS

Hereinafter, an embodiment of a gas chromatograph mass spectrometry (GC-MS) system including a chromatograph mass spectrometry data processing device according to the present invention will be described with reference to the attached drawings.

Figure 1:
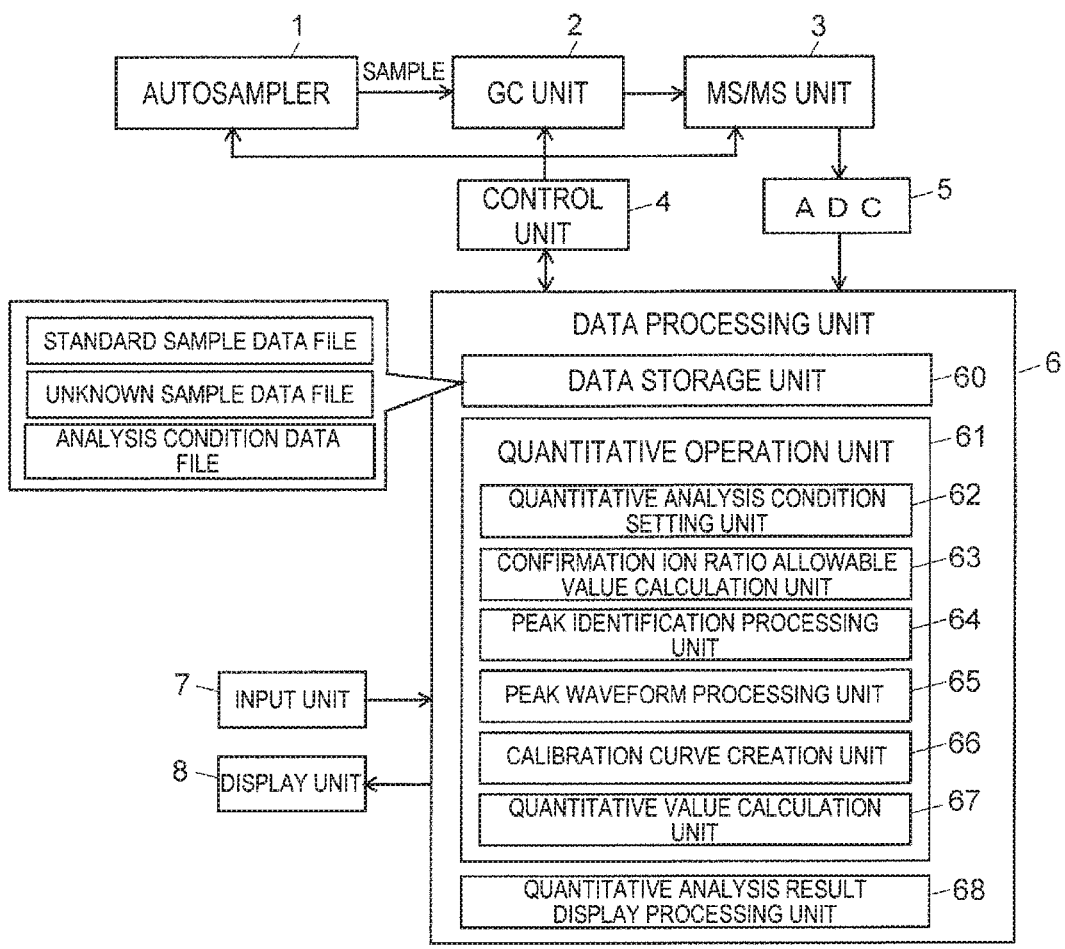
FIG. 1 is a configuration diagram of main parts of an embodiment of a GC-MS system including a chromatograph mass spectrometry data processing device according to the present invention.

FIG. 1 is a configuration diagram of main parts of the GC-MS system of the present embodiment.

The GC-MS system of the present embodiment includes, as measurement units, an autosampler 1, a gas chromatography unit (GC unit) 2, and a tandem mass spectrometry unit (MS/MS unit) 3 which are controlled by controlled by a control unit 4, and further includes an analog-to-digital converter (ADC) 5, a data processing unit 6, an input unit 7, and a display unit 8. The data processing unit 6 corresponds to the chromatograph mass spectrometry data processing device according to the present invention.

The autosampler 1 automatically selects a plurality of samples prepared in advance in a vial under the control of the control unit 4 and supplies the selected sample to the gas chromatography unit 2. Although not illustrated, the gas chromatography unit 2 includes a sample vaporization chamber, a column, a column oven, and a carrier gas supply unit. In the gas chromatography unit 2, a liquid sample supplied from the autosampler 1 is vaporized in the sample vaporization chamber, and the vaporized sample is introduced into the column according to a flow of a carrier gas. Various compounds in the sample are separated temporally while the sample passes through the column, exit from an outlet of the column, and are introduced into the tandem mass spectrometry unit 3.

The tandem mass spectrometry unit 3 is typically a triple quadrupole mass spectrometer in which quadrupole mass filters are arranged in front and in back of a collision cell with the collision cell interposed between the quadrupole mass filters. For example, in the tandem mass spectrometry unit 3, the compounds in the introduced gas sample are ionized by an ion source. Among various generated ions, ions having a specific mass-to-charge ratio pass through the front-stage quadrupole mass filter, and are introduced into the collision cell. A collision gas such as argon is introduced into the collision cell. The ions come in contact with the collision gas, and are cleaved by collision-induced dissociation (CID). Various product ions generated in this manner are introduced into the rear-stage quadrupole mass filter. Among these various product ions, ions having a specific mass-to-charge ratio pass through the rear-state quadrupole mass filter, reach a detector, and are detected by the detector. The detector generates a detection signal corresponding to the amount of reached ions. The detection signal is digitized by the analog-to-digital converter 5, and is input, as measurement data, to the data processing unit 6. This operation is an operation of a multiple reaction monitoring (MRM) measurement mode, and can also be another MS/MS analysis such as a product ion scan measurement mode.

The data processing unit 6 includes, as functional blocks, a data storage unit 60, a quantitative operation unit 61, and a quantitative analysis result display processing unit 68. Furthermore, the quantitative operation unit 61 includes a quantitative analysis condition setting unit 62, a confirmation ion ratio allowable value calculation unit 63, a peak identification processing unit 64, a peak waveform processing unit 65, a calibration curve creation unit 66, and a quantitative value calculation unit 67. The entity of the data processing unit 6 is a personal computer (or a higher-performance workstation) including a CPU, a ROM, a RAM, a HDD, and an auxiliary storage device such as SDD. Dedicated data processing software installed on the computer operates on the computer, and thus, the functions of the respective units are achieved. That is, this data processing software corresponds to a chromatograph mass spectrometry data processing program according to the present invention.

Figure 4:
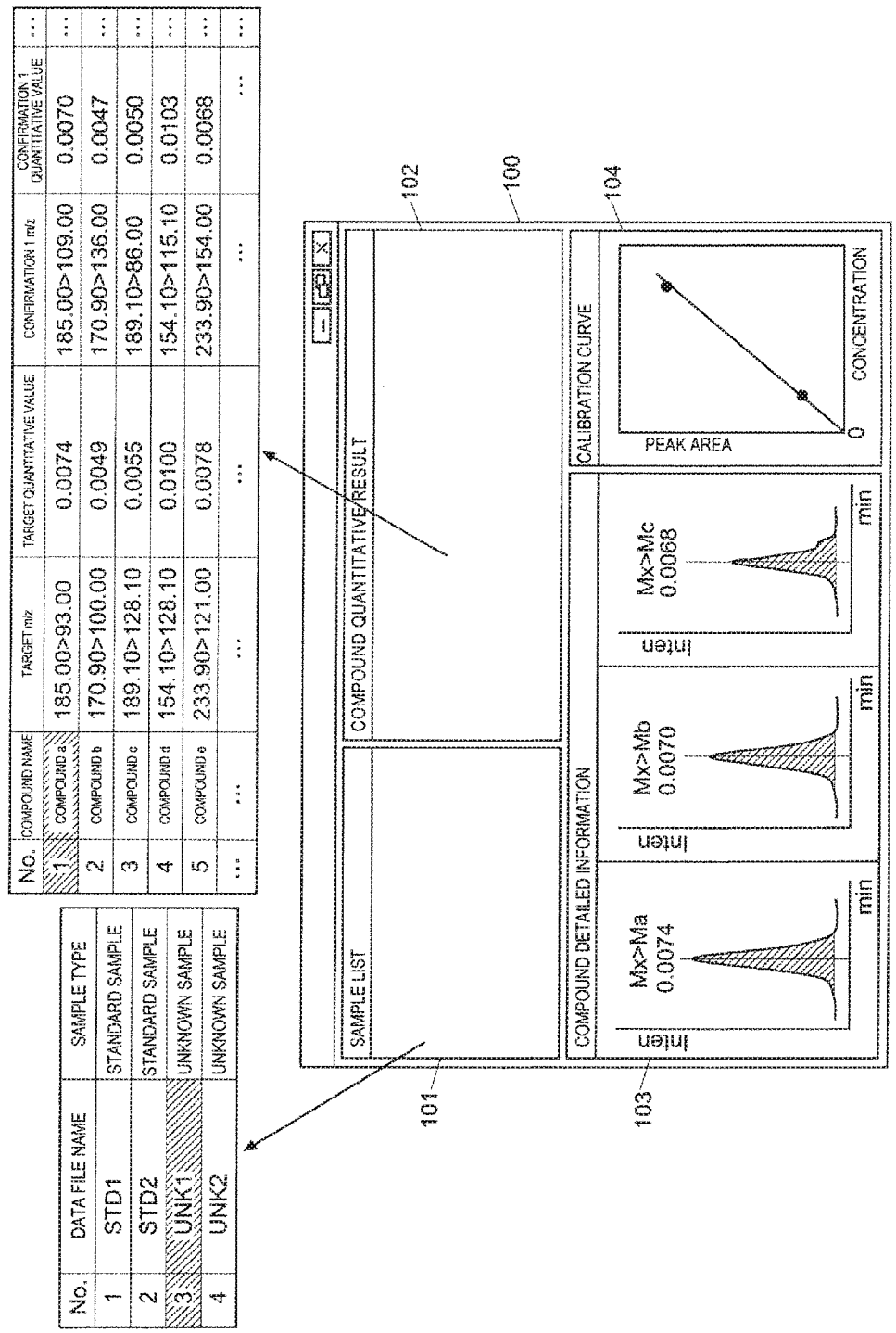
FIG. 4 is a diagram showing an example of a display screen of a quantitative analysis result in the GC-MS system of the present embodiment.

Next, characteristic quantitative analysis in the GC-MS system of the present embodiment will be described with reference to FIGS. 2 to 4. FIG. 2 is a flowchart illustrating a processing procedure of characteristic quantitative analysis processing in the GC-MS system of the present embodiment, FIGS. 3A to 3D are specific explanatory diagrams of the characteristic quantitative analysis processing shown in FIG. 2, and FIG. 4 is a diagram illustrating an example of a display screen of a quantitative analysis result in the GC-MS system of the present embodiment.

Here, it is assumed that multi-component simultaneous analysis in which a plurality of compounds contained in an unknown sample are quantitatively analyzed simultaneously. In this multi-component simultaneous analysis, the kind itself of the compound to be analyzed is determined in advance, and the purpose thereof is to calculate the content (concentration) of each compound. Of course, the unknown sample may not contain the target compound. IN this case, the content of the compound becomes zero (or is equal to or less than a detection lower limit).

When the multi-component simultaneous analysis is performed on the unknown sample, since it is necessary to create a calibration curve for each compound, a measurement unit measures a standard sample containing each compound of which the concentration is known and an unknown sample which is a quantitative analysis target. Here, two kinds of standard samples having different concentrations at two stages and one or a plurality of unknown samples are prepared in the autosampler 1.

Prior to the measurement, a user determines a measurement time range, one target ion, and one or a plurality of confirmation ions in advance for each target compound, and inputs, as an analysis condition, these information through the input unit 7. Here, since the MRM measurement is performed by the tandem mass spectrometry unit 3, both the target ion and the confirmation ion are MRM transitions, that is, a combination of a mass-to-charge ratio of one precursor ion and a mass-to-charge ratio of one product ion.

Now, as illustrated in FIG. 3A, it is assumed that for a certain target compound, product ions of which mass-to-charge ratios on a MS/MS spectrum (product ion spectrum) obtained for one precursor ion (mass-to-charge ratio: Mx) are Ma, Mb, and Mc are set as a target ion and two kinds of confirmation ions (confirmation ion 1 and confirmation ion 2). That is, the target ion, the confirmation ion 1, and the confirmation ion 2 are MRM transitions of Mx>Ma, Mx>Mb, and Mx>Mc, respectively.

Under the control of the control unit 4, the autosampler 1 sequentially selects a plurality of prepared samples (the standard sample and the unknown sample), and the gas chromatography unit 2 and the tandem mass spectrometry unit 3 measure the selected samples. In this case, the control unit 4 controls the operation of the tandem mass spectrometry unit 3 such that the MRM measurement of the MRM transitions corresponding to the target ion and the confirmation ions is performed in each predetermined measurement time range according to the analysis conditions set as described above. Accordingly, the MRM measurement is performed on the target ion and the confirmation ions set for each compound separated in a time direction by the gas chromatography unit 2. Signals indicating ion intensity of the target ion and the confirmation ions are digitized by the analog-to-digital converter 5, and are input to the data processing unit 6.

Through the series of measurements described above, a standard sample data file storing data obtained by measuring two kinds of standard samples and an unknown sample data file storing data obtained by measuring one or a plurality of unknown samples are stored in the data storage unit 60 which is an auxiliary storage device of the personal computer. Further, information on the target ion and confirmation ions of each compound or information such as an allowable value of a confirmation ion ratio set before the measurement is collectively stored in an analysis condition data file associated with the data files. The information stored in such an analysis condition data file may be stored in each data file.

The user designates the data file to be quantitatively analyzed through the input unit 7 and instructs the execution of the quantitative analysis in a state in which the data is stored in the data storage unit 60 as described above. In response to this instruction, the quantitative operation unit 61 reads out the designated standard sample data file and unknown sample data file, and the analysis condition data file related to these files from the data storage unit 60, and temporarily stores it in a main memory (step S1).

Subsequently, the quantitative operation unit 61 selects one compound from an identification target compound list set by the user in advance, and sets the selected compound as a target compound of a processing target (step S2). The quantitative analysis condition setting unit 62 acquires setting information, such as a confirmation ion ratio allowable value, regarding the target ion for the target compound from the data stored in the main memory (step S3).

The confirmation ion ratio allowable value is a criterion for confirming whether a peak of the target ion is truly derived from the target compound based on a ratio of intensity of a mass peak of the confirmation ion to intensity of a mass peak of the target ion. Accordingly, it is necessary to recalculate the criterion for confirming whether the mass peak of the confirmation ion is really derived from the target compound based on the set confirmation ion ratio allowable value. Thus, the confirmation ion ratio allowable value calculation unit 63 recalculates the confirmation ion ratio allowable value for each combination when the target ion and the confirmation ions are interchanged. In this example, since there are two kinds of confirmation ion ratios, the combinations when target ion and confirmation ions are interchanged are three sets of [A], [B], and [C] illustrated in FIG. 3C. When there is only one type of confirmation ion, there are only two combinations occur when the target ion and the confirmation ions are interchanged, and the number of combinations increases as the number of kinds of the confirmation ions increases. The reciprocal of the original confirmation ion ratio allowable value may be calculated as the confirmation ion ratio allowable value when the target ion and the confirmation ions are interchanged.

Subsequently, the peak identification processing unit 64 creates extraction ion chromatograms at the mass-to-charge ratios of the target ion and the confirmation ions derived from the target compound as illustrated in FIG. 3B based on the data obtained for the unknown sample and the standard sample. For example, the peaks are identified by performing peak detection in each extraction ion chromatogram, calculating a confirmation ion ratio from the intensity of the mass peak of the target ion and the intensity of the mass peak of the confirmation ions at retention times of the peak top of the detected chromatogram peaks, and determining whether or not the confirmation ion ratio falls within the confirmation ion ratio allowable value obtained in step S4 (step S5). This peak identification is performed for each combination when the target ion and the confirmation ions are interchanged, and it is determined whether the intensity of the mass peak of the target ion or the mass peak of the confirmation ions falls within a prescribed confirmation ion ratio allowable value.

When the intensity of the mass peak of the target ion or the intensity of the mass peak of the confirmation ions does not fall within a prescribed confirmation ion ratio allowable value, various countermeasures can be taken. For example, in this case, since there is a possibility that the peak detection on the extraction ion chromatogram is not to be appropriate, the peak detection may be performed again, that is, search for another peak may be attempted. In addition, since there is a possibility that impurities are to overlap with the peaks derived from the target compound, when the intensities of the mass peaks of the target ion and all the confirmation ions are out of the confirmation ion ratio allowable value, the quantitative analysis of the target compound is stopped. Meanwhile, when the intensity of the mass peak of at least any one ion falls within the confirmation ion ratio allowable value, the quantitative analysis may be continued after the fact that the intensity of the mask peak thereof is out of the allowable value is recorded. Such a countermeasure can be appropriately determined.

When it is confirmed that the peak of the ion derived from the target compound is appropriately identified in step S5, the peak waveform processing unit 65 performs waveform processing on the chromatogram peak to be observed on each extraction ion chromatogram according to the waveform processing condition set in advance, and calculates an area value of the peak (step S6). The waveform processing condition is used for determining a start point and an end point of the peak or how to draw a baseline. The process of step S6 may be performed prior to the step S5. The peak identification may be performed by calculating the confirmation ion ratio by using the calculated peak area value. In this step S6, for all of the unknown sample and the standard sample, the area values of the chromatogram peaks of the target ion and confirmation ions corresponding to the target compound are calculated.

Thereafter, the calibration curve creation unit 66 creates the calibration curve for each combination by using each peak area values obtained for each combination of the target ion and the two confirmation ions derived from the target compound in two standard samples of which the concentrations of the compounds are different (step S7). That is, as illustrated in FIG. 3D, since chromatogram peaks of target ions or confirmation ions having different peak area values are obtained for the target compounds of two kinds of concentrations C1 and C2, it is possible to create a calibration curve from a relationship between the concentrations C1 and C2 and the peak area values. Since this calibration curve is obtained for each combination of [A], [B], and [C] shown in FIG. 3C, three calibration curves are obtained in this example.

Here, although there are only two kinds of concentrations of the compounds, it is possible to create more accurate calibration curves by creating the calibration curves from the results of preferably three to five different kinds of concentrations. In particular, when the calibration curve has non-linearity, many plots may be present in order to create the calibration curve.

As illustrated in FIG. 3D, the quantitative value calculation unit 67 calculates a quantitative value (concentration value) by comparing each peak area value obtained for each combination of the target ion and the two confirmation ions in the unknown sample derived from the target compound with the calibration curve corresponding to each combination (step S8). Here, the quantitative value is determined for each combination of [A], [B], and [C] for the target compound in one unknown sample. That is, three kinds of quantitative values are obtained. When there quantitative values may be equal to each other or different from each other.

When a quantitative value is obtained for a certain target compound, the quantitative operation unit 61 determines whether or not the processing is ended for all the compounds present in the compound list to be identified (step S9). When there is an unprocessed compound, the process returns from step S9 to S2, the unprocessed compound is set as the next target compound to be identified, and the processes of steps S3 to S8 are performed. The processes of steps S2 to S8 are repeated for all the compounds present in the compound list to be identified, and when it is determined as Yes in step S9, the process proceeds from step S9 to step S10.

In step S10, the quantitative analysis result display processing unit 68 creates a quantitative analysis result display screen illustrated in FIG. 4 in which the quantitative analysis results for all the target compounds are collected, and displays the quantitative analysis result display screen on a screen of the display unit 8. A sample list display field 101, a compound quantitative result display field 102, a compound detailed information display field 103, and a calibration curve display field 104 are arranged on the quantitative analysis result display screen 100 illustrated in FIG. 4.

In this example, a sample list in which a data file name storing measurement data of a sample to be identified and a sample type (standard sample or unknown sample) are displayed as a list in the sample list display field 101.

In addition, a name of the compound to be identified, a compound list including a mass-to-charge ratio (MRM transition) of the target ion, a quantitative value when the target ion is used for quantification, a mass-to-charge ratio (MRM transition) of the confirmation ion, and a quantitative value when the confirmation ion is used for quantification is displayed in the compound quantitative result display field 102. The user can confirm the quantitative value when the target ion is used for quantification and the quantitative value when the confirmation ions are used for quantification together for each compound by confirming the compound list.

In the compound detailed information display field 103, the peak waveforms of the extraction ion chromatograms of the target ion and the confirmation ion which are used for quantifying a compound ("compound a" shaded in FIG. 4) designated by the user on the compound list displayed in the compound quantitative result display field 102 are displayed side by side. The mass-to-charge ratios (MRM transitions) of the target ion and the confirmation ions and the calculated quantitative values are displayed together in the vicinity of each peak waveform. The peak area values and the retention times may be displayed together. When the user performs a click operation for a row of an arbitrary compound on the compound list, the quantitative analysis result display processing unit 68 updates the peak waveform displayed in the compound detailed information display field 103 to the display of the peak waveforms of the extraction ion chromatograms of the target ion and the confirmation ions corresponding to the compound instructed by this operation. For example, the user can determine whether or not impurities overlap with the target compound or whether or not the peak is saturated by comparing these peak waveforms, and can estimate which of the quantitative value based the target ion and the quantitative values based on the plurality of confirmation ions has the highest reliability.

The calibration curve corresponding to any of the target ion and the plurality of confirmation ions displayed in the compound detailed information display field 103 is displayed in the calibration curve display field 104. When the user appropriately clicks the vicinity of the three peak waveforms displayed in the compound detailed information display field 103, the quantitative analysis result display processing unit 68 updates the calibration curve displayed in the calibration curve display field 104 to the display of the calibration curve corresponding to the ion designated by the operation. When the linearity of the calibration curve is not favorable or when a deviation between the calibration curve and the plot representing an actually measured peak area is large (when a variation of the plot is large), there is a possibility that the reliability of the quantitative value based on the calibration curve is to be low. Therefore, the user can estimate that the quantitative values have the highest reliability based on any of the target ion and the confirmation ions by confirming the calibration curve.

Although only one calibration curve is displayed in FIG. 4, the calibration curves may be displayed so as to correspond to the peak waveforms displayed in the compound detailed information display field 103. Display colors of the peak waveforms may be displayed so as to overlap with each other in the compound detailed information display field 103 while being changed on the same time axis and intensity axis instead of displaying the plurality of peak waveforms side by side. Further, stack display in which the peak waveforms are slightly shifted in a vertical axis direction may be performed. For example, the display method of the peak waveforms and the calibration curves can be appropriately changed according to the amount of information to be displayed.

In addition, more useful information may be further displayed when the user estimates which of the quantitative value based on the target ion and the quantitative values based on the plurality of confirmation ions for one target compound has the highest reliability. For example, an index value indicating a degree of linearity of the calibration curve or a degree of variation (dispersion) of the plot may be calculated and displayed. Furthermore, a threshold value of such an index value may be set in advance, and a determination result of whether or not the calculated index value exceeds the threshold value may be displayed. In addition, an index value indicating a degree of similarity between waveform shapes of a plurality of peak waveforms displayed in the compound detailed information display field 103 may be calculated, and the calculated index value may be displayed or a determination result of whether or not the index value is equal to or less than a preset threshold value (that is, the similarity is low) may be displayed. In general, since the peak waveform shape is likely to follow a fixed distribution function such as a Gaussian distribution, a degree of deviation between a curve drawn according to such a distribution function and an actual peak waveform shape may be indexed and displayed.

As described above, in the GC-MS system of the present embodiment, the quantitative values based on the target ion and one or the plurality of confirmation ions set for the quantification in advance are automatically calculated for each compound in the sample, and the quantitative values and the peak waveforms of the extraction ion chromatograms used for the calculation of the quantitative values are displayed together on the same display screen. Accordingly, it is not necessary to perform the quantitative analysis again while interchanging the target ion and the confirmation ions, and even though there are the plurality of confirmation ions, it is possible to collectively compare and evaluate all the quantitative analysis results based on the target ion and the plurality of confirmation ions.

Although it has been described in the aforementioned embodiment that the present invention is applied to the GC-MS system in which the mass spectrometer is the tandem mass spectrometer, the mass spectrometer is not the tandem type, and may be, for example, a single quadrupole type mass spectrometer. In this case, in the mass spectrometer, SIM measurement may be performed instead of the MRM measurement. It is also clear that the present invention can be applied to the quantitative analysis using data collected by the LC-MS rather than the GC-MS.

REFERENCE SIGNS LIST

1 . . . Autosampler
2 . . . Gas Chromatography (GC) Unit
3 . . . Tandem Mass Spectrometry (MS/MS) Unit
4 . . . Control Unit
5 . . . Analog-To-Digital Converter (ADC)
6 . . . Data Processing Unit
60 . . . Data Storage Unit
61 . . . Quantitative Operation Unit
62 . . . Quantitative Analysis Condition Setting Unit
63 . . . Confirmation Ion Ratio Setting Value Calculation Unit
64 . . . Peak Identification Processing Unit
65 . . . Peak Waveform Processing Unit
66 . . . Calibration Curve Creation Unit
67 . . . Quantitative Value Calculation Unit
68 . . . Quantitative Analysis Result Display Processing Unit
7 . . . Input Unit
8 . . . Display unit

The invention claimed is:

1. A chromatograph mass spectrometry data processing device configured to create extraction ion chromatograms for a target ion having a predetermined mass-to-charge ratio and one or a plurality of confirmation ions having a mass-to-charge ratio different from the mass-to-charge ratio of the target ion which are derived from a target compound based on data collected by measuring a sample including the target compound by using a chromatograph mass spectrometer and quantifies the target compound by using peaks on the extraction ion chromatograms, the device comprising:

a) a target-ion-based quantitative calculation unit configured to create the extraction ion chromatogram of the target ion determined for the target compound in advance based on the data collected through the measurement, and calculates a quantitative value by using an area or a height of the peak corresponding to the target compound on the chromatogram;

b) a confirmation-ion-based quantitative calculation unit configured to create the extraction ion chromatograms of the one or the plurality of confirmation ions determined for the target compound in advance based on the data, and calculates quantitative values by using areas or heights of the peaks corresponding to the target compound on the chromatograms; and c) a display processing unit configured to form, as a quantitative analysis result of the target compound, a display image on which the quantitative value of the target compound obtained by the target-ion-based quantitative calculation unit and a peak waveform of the extraction ion chromatogram used for the calculation and the quantitative values of the target compound obtained by the confirmation-ion-based quantitative calculation unit and peak waveforms of the extraction ion chromatograms used for the calculation are arranged on the same screen, and displays the formed display image on a screen of a display unit.

2. The chromatograph mass spectrometry data processing device according to claim 1, wherein the target-ion-based quantitative calculation unit and the confirmation-ion-based quantitative calculation unit are configured to calculate the quantitative values while referring to a calibration curve for the target ion and calibration curves for the confirmation ions which are created based on data obtained by measuring a standard sample including a target compound having a known concentration, and the display processing unit forms a display image on which the quantitative value of the target compound obtained by using the target ion and the peak waveform of the extraction ion chromatogram used for the calculation, the quantitative values of the target compound obtained by using the confirmation ions and the peak waveforms of the extraction ion chromatograms used for the calculation, and all the calibration curves for the target ion and the confirmation ions referred to during the quantitative calculation or the calibration curve selected from the plurality of calibration curves are arranged on the same screen.

3. A non-transitory computer-readable medium recording a chromatograph mass spectrometry data processing program making a computer to create extraction ion chromatograms for a target ion having a predetermined mass-to-charge ratio and one or a plurality of confirmation ions having a mass-to-charge ratio different from the mass-to-charge ratio of the target ion which are derived from a target compound based on data collected by measuring a sample including the target compound by using a chromatograph mass spectrometer and quantifies the target compound by using peaks on the extraction ion chromatograms, the program making the computer to execute:

d) a target-ion-based quantitative calculation step of creating the extraction ion chromatogram of the target ion determined for the target compound in advance based on the data collected through the measurement, and calculating a quantitative value by using an area or a height of the peak corresponding to the target compound on the chromatogram;

e) a confirmation-ion-based quantitative calculation step of creating the extraction ion chromatograms of the one or the plurality of confirmation ions determined for the target compound in advance based on the data, and calculating quantitative values by using areas or heights of the peaks corresponding to the target compound on the chromatograms; and f) a display processing step of forming, as a quantitative analysis result of the target compound, a display image on which the quantitative value of the target compound obtained in the target-ion-based quantitative calculation step and a peak waveform of the extraction ion chromatogram used for the calculation and the quantitative values of the target compound obtained in the confirmation-ion-based quantitative calculation step and peak waveforms of the extraction ion chromatograms used for the calculation are arranged on the same screen, and displaying the formed display image on a screen of a display unit.

4. The non-transitory computer-readable medium according to claim 3, wherein in the target-ion-based quantitative calculation step and the confirmation-ion-based quantitative calculation step, the quantitative values are calculated while referring to a calibration curve for the target ion and calibration curves for the confirmation ions which are created based on data obtained by measuring a standard sample including a target compound having a known concentration, and in the display processing step, a display image on which the quantitative value of the target compound obtained by using the target ion and the peak waveform of the extraction ion chromatogram used for the calculation, the quantitative values of the target compound obtained by using the confirmation ions and the peak waveforms of the extraction ion chromatograms used for the calculation, and all the calibration curves for the target ion and the confirmation ions referred to during the quantitative calculation or the calibration curve selected from the plurality of calibration curves are arranged is formed on the same screen.

* * * * *